(12) United States Patent
Lynn

(10) Patent No.: US 10,651,786 B2
(45) Date of Patent: May 12, 2020

(54) PANEL WITH MAGNETICALLY-CONTROLLED CONNECTORS FOR ATTACHMENT TO A SUPPORT MEMBER

(71) Applicant: David Lynn, Welcome, NC (US)

(72) Inventor: David Lynn, Welcome, NC (US)

( * ) Notice: Subject to any disclaimer, the term of this patent is extended or adjusted under 35 U.S.C. 154(b) by 0 days.

(21) Appl. No.: 15/864,614

(22) Filed: Jan. 8, 2018

(65) Prior Publication Data

US 2019/0214941 A1     Jul. 11, 2019

(51) Int. Cl.
| H02S 40/34 | (2014.01) |
| F16B 1/00  | (2006.01) |
| H02S 30/10 | (2014.01) |
| H02S 30/00 | (2014.01) |
| F16B 5/00  | (2006.01) |

(52) U.S. Cl.
CPC .............. *H02S 40/34* (2014.12); *F16B 1/00* (2013.01); *H02S 30/00* (2013.01); *H02S 30/10* (2014.12); *F16B 5/0008* (2013.01); *F16B 2001/0035* (2013.01)

(58) Field of Classification Search
CPC .......... H02S 40/34; H02S 30/00; H02S 30/10; F16B 1/00; F16B 2001/0035; F16B 5/008; E05B 47/0038; A45C 13/1069; Y10T 292/11; Y10T 70/7057; Y10T 24/32
USPC ...................................................... 248/683
See application file for complete search history.

(56) References Cited

U.S. PATENT DOCUMENTS

| 854,153 A | 5/1907 | Dodds |
| 3,015,045 A | 12/1961 | Ward |
| 3,298,730 A | 1/1967 | Soley |
| 3,920,212 A | 11/1975 | Westwood |
| 3,974,581 A | 8/1976 | Martens et al. |
| 3,975,813 A | 8/1976 | Bell |
| 4,185,261 A | 1/1980 | Nagata |
| 4,339,853 A | 7/1982 | Lipschitz |
| 4,570,194 A | 2/1986 | Schatteman |
| 4,651,136 A | 3/1987 | Anderson et al. |
| 4,718,681 A | 1/1988 | Kakehi et al. |
| 4,802,523 A * | 2/1989 | Scholten ............... A47H 23/02 160/354 |
| 4,919,464 A | 4/1990 | Richards |
| 5,009,243 A | 4/1991 | Barker |
| 5,038,535 A | 8/1991 | Van Praag, III |
| 5,061,112 A | 10/1991 | Monford, Jr. |
| 5,076,623 A | 12/1991 | Richards |
| 5,094,567 A | 3/1992 | Nista et al. |
| 5,125,601 A | 6/1992 | Monford, Jr. |
| 5,337,459 A | 8/1994 | Hogan |

(Continued)

FOREIGN PATENT DOCUMENTS

| CN | 103715286 A | 4/2014 |
| CN | 203690320 U | 7/2014 |

(Continued)

*Primary Examiner* — Christopher Garft
(74) *Attorney, Agent, or Firm* — Coats & Bennett, PLLC

(57) ABSTRACT

Panels equipped with magnetically-controlled connectors that are movable between an open position and a closed position. When the connectors are in the open position, the panels can be moved relative to the support frame. In the closed position, the connectors engage with the support frame to secure the panel to the frame.

14 Claims, 18 Drawing Sheets

(56) References Cited

U.S. PATENT DOCUMENTS

| | | | |
|---|---|---|---|
| 5,485,733 A * | 1/1996 | Hoffman | E05B 47/004 70/276 |
| 5,644,177 A | 7/1997 | Guckel et al. | |
| 5,781,974 A | 7/1998 | Breil et al. | |
| 6,066,796 A | 5/2000 | Itoyama et al. | |
| 6,084,498 A | 7/2000 | Stelter et al. | |
| 6,499,907 B1 | 12/2002 | Baur | |
| 6,584,737 B1 | 7/2003 | Bradley, Jr. | |
| 6,677,846 B2 | 1/2004 | Snider | |
| 6,765,330 B2 | 7/2004 | Baur | |
| 6,786,012 B2 | 9/2004 | Bradley, Jr. | |
| 6,936,789 B2 | 8/2005 | Hanzel | |
| 7,217,059 B1 | 5/2007 | Rudduck | |
| 7,331,616 B2 | 2/2008 | Brei et al. | |
| 7,481,211 B2 | 1/2009 | Klein | |
| 7,501,572 B1 | 3/2009 | Rabinowitz | |
| 7,567,159 B2 | 7/2009 | Macken | |
| 7,631,467 B2 | 12/2009 | Clarke | |
| 7,814,899 B1 | 10/2010 | Port | |
| 7,921,843 B1 | 4/2011 | Rawlings | |
| 7,971,398 B2 | 7/2011 | Tweedie | |
| 8,136,310 B2 | 3/2012 | Tweedie | |
| 8,151,789 B2 | 4/2012 | Klein | |
| 8,156,628 B2 | 4/2012 | Roth | |
| 8,166,836 B2 | 5/2012 | Rudduck | |
| 8,225,557 B2 | 7/2012 | Stearns et al. | |
| 8,413,388 B2 | 4/2013 | Stearns et al. | |
| 8,418,419 B1 | 4/2013 | Aseere et al. | |
| 8,418,688 B2 | 4/2013 | King et al. | |
| 8,453,986 B2 | 6/2013 | Schnitzer | |
| 8,455,752 B2 | 6/2013 | Korman et al. | |
| 8,464,478 B2 | 6/2013 | Tweedie | |
| 8,522,492 B2 | 9/2013 | Tachino | |
| 8,595,996 B2 | 12/2013 | Korman et al. | |
| 8,674,212 B2 | 3/2014 | Huber et al. | |
| 8,733,027 B1 | 5/2014 | Marston et al. | |
| 8,748,733 B2 | 6/2014 | Leary | |
| 8,752,338 B2 | 6/2014 | Schaefer et al. | |
| 8,756,881 B2 | 6/2014 | West et al. | |
| 8,763,978 B2 | 7/2014 | Newman et al. | |
| 8,776,456 B1 | 7/2014 | Schrock | |
| 8,826,606 B2 | 9/2014 | Yen | |
| 8,881,472 B2 | 11/2014 | Knapp | |
| 8,922,972 B2 | 12/2014 | Korman et al. | |
| 8,950,157 B1 | 2/2015 | Schrock | |
| 8,960,615 B1 | 2/2015 | Johnson et al. | |
| 9,021,841 B2 | 5/2015 | Kottenstette | |
| 9,057,545 B2 | 6/2015 | Stapleton | |
| 9,057,546 B2 | 6/2015 | Sade | |
| 9,080,792 B2 | 7/2015 | Patton et al. | |
| 9,145,685 B2 | 9/2015 | Stapleton | |
| 9,146,009 B2 | 9/2015 | Zhu | |
| 9,106,023 B2 | 11/2015 | Schaefer et al. | |
| 9,225,126 B2 | 12/2015 | Janfada et al. | |
| 9,231,518 B2 | 1/2016 | Cinnamon et al. | |
| 9,252,310 B2 | 2/2016 | Stephan et al. | |
| 9,267,278 B1 | 2/2016 | Gibson | |
| 9,297,169 B2 | 3/2016 | Pantev | |
| 9,307,797 B2 | 4/2016 | Sanchez Giraldez | |
| 9,331,629 B2 | 5/2016 | Cheung et al. | |
| 9,453,660 B2 | 9/2016 | French et al. | |
| 9,455,662 B2 | 9/2016 | Meine | |
| 9,548,696 B2 | 1/2017 | Atchley et al. | |
| 9,694,990 B2 | 7/2017 | Voser et al. | |
| 9,696,769 B1 * | 7/2017 | Hamilton | G06F 1/20 |
| 10,060,462 B2 * | 8/2018 | Nilsson | A47B 47/042 |
| 2005/0062296 A1 | 3/2005 | Lyon | |
| 2005/0166383 A1 | 8/2005 | Newberry | |
| 2005/0269827 A1 | 12/2005 | Heard | |
| 2006/0175842 A1 * | 8/2006 | Saitoh | E05C 19/163 292/251.5 |
| 2007/0212166 A1 | 9/2007 | Rudduck | |
| 2008/0149170 A1 | 6/2008 | Hanoka | |
| 2008/0179895 A1 * | 7/2008 | Lin | E05B 47/004 292/116 |
| 2008/0191494 A1 * | 8/2008 | Carabalona | E05B 47/004 292/2 |
| 2008/0231060 A1 * | 9/2008 | Carabalona | E05B 77/06 292/251.5 |
| 2008/0265588 A1 * | 10/2008 | Carabalona | E05C 3/16 292/251.5 |
| 2009/0114269 A1 | 5/2009 | Fletcher et al. | |
| 2009/0211621 A1 | 8/2009 | LeBlanc | |
| 2009/0293383 A1 | 12/2009 | Venter et al. | |
| 2010/0175337 A1 | 7/2010 | Mascolo et al. | |
| 2010/0212654 A1 | 8/2010 | Alejo Trevijano | |
| 2010/0319291 A1 | 12/2010 | Pervan et al. | |
| 2011/0079214 A1 | 4/2011 | Hon | |
| 2011/0120532 A1 | 5/2011 | Neugent et al. | |
| 2011/0154774 A1 | 6/2011 | Rawlings | |
| 2011/0203637 A1 | 8/2011 | Patton et al. | |
| 2011/0314751 A1 | 12/2011 | Jette | |
| 2012/0228442 A1 | 9/2012 | Clifton | |
| 2013/0036683 A1 | 2/2013 | Seymour et al. | |
| 2013/0149029 A1 | 6/2013 | Changsrivong et al. | |
| 2013/0174887 A1 | 7/2013 | Yagi | |
| 2013/0193301 A1 | 8/2013 | Jackson et al. | |
| 2013/0219812 A1 | 8/2013 | Goodman et al. | |
| 2014/0003861 A1 | 1/2014 | Cheung et al. | |
| 2014/0060626 A1 | 3/2014 | Stephan et al. | |
| 2014/0061411 A1 | 3/2014 | Stephan et al. | |
| 2014/0090310 A1 | 4/2014 | Greene | |
| 2014/0158184 A1 | 6/2014 | West et al. | |
| 2014/0167424 A1 | 6/2014 | Frias | |
| 2014/0196770 A1 | 7/2014 | Jacobs, IV | |
| 2015/0027509 A1 | 1/2015 | Levin | |
| 2015/0200618 A9 | 7/2015 | West et al. | |
| 2015/0249425 A1 | 9/2015 | Fukumochi | |
| 2015/0256125 A1 | 9/2015 | Kouyanagi et al. | |
| 2015/0288327 A1 | 10/2015 | Cherukupalli et al. | |
| 2015/0295534 A1 | 10/2015 | Maruyama et al. | |
| 2015/0322979 A1 | 11/2015 | Giacalone et al. | |
| 2015/0322980 A1 | 11/2015 | Giacalone et al. | |
| 2015/0330669 A1 | 11/2015 | Port et al. | |
| 2015/0372635 A1 | 12/2015 | Praca et al. | |
| 2016/0056316 A1 | 2/2016 | Clark | |
| 2016/0056752 A1 | 2/2016 | Atchley et al. | |
| 2016/0072426 A1 | 3/2016 | Babineau, Jr. et al. | |
| 2016/0118726 A1 | 4/2016 | Schaefer et al. | |
| 2016/0138833 A1 | 5/2016 | Stephan et al. | |
| 2016/0142006 A1 | 5/2016 | Meine et al. | |
| 2016/0214547 A1 | 7/2016 | Iriarte Jimenez et al. | |
| 2016/0254774 A1 | 9/2016 | Brady et al. | |
| 2016/0336695 A1 | 11/2016 | Janfada et al. | |
| 2017/0012573 A1 | 1/2017 | Flaherty et al. | |
| 2017/0012574 A1 | 1/2017 | Babineau, Jr. et al. | |

FOREIGN PATENT DOCUMENTS

| | | |
|---|---|---|
| DE | 202012100662 U1 | 5/2013 |
| EP | 2746501 A2 | 6/2014 |
| JP | 2012107449 A | 6/2012 |
| JP | 2013040462 A | 2/2013 |
| JP | 2015192480 A | 11/2015 |
| WO | 2004017424 A2 | 2/2004 |
| WO | 2010144637 A1 | 12/2010 |
| WO | 2013026944 A1 | 2/2013 |
| WO | 2013086265 A1 | 6/2013 |
| WO | 2015110254 A1 | 7/2015 |
| WO | 2016020670 A2 | 2/2016 |
| WO | 2016192848 A2 | 12/2016 |
| WO | 2017007467 A1 | 1/2017 |

\* cited by examiner

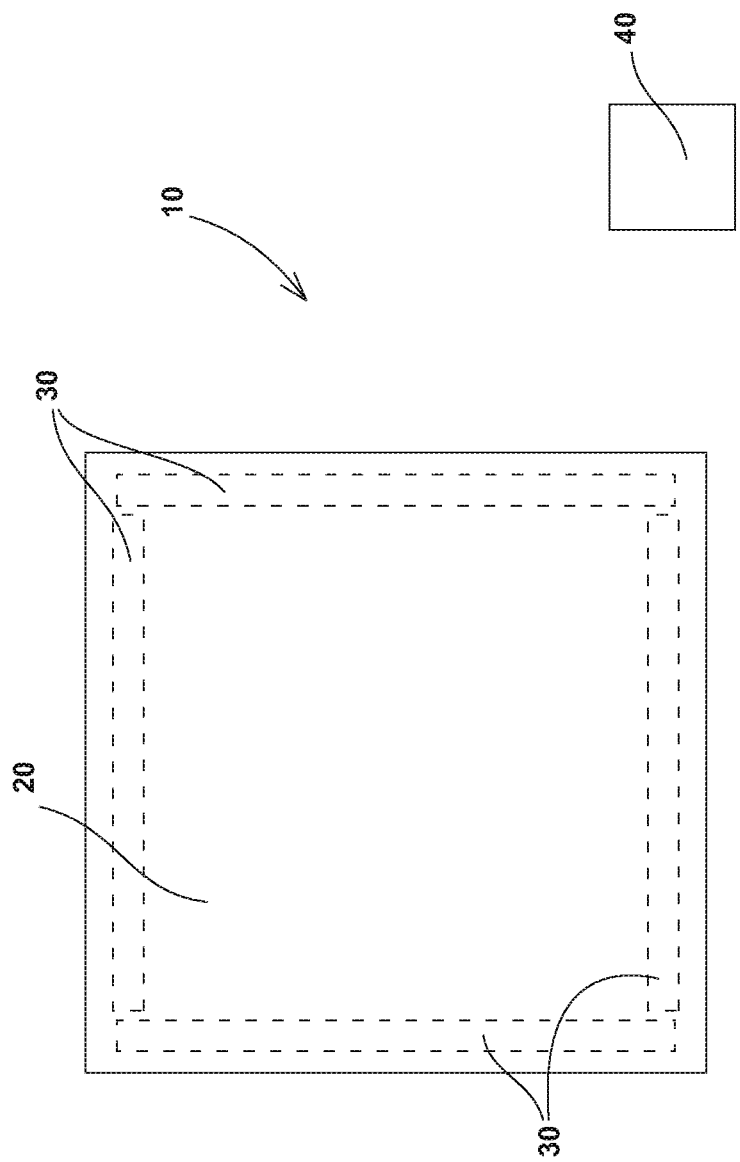

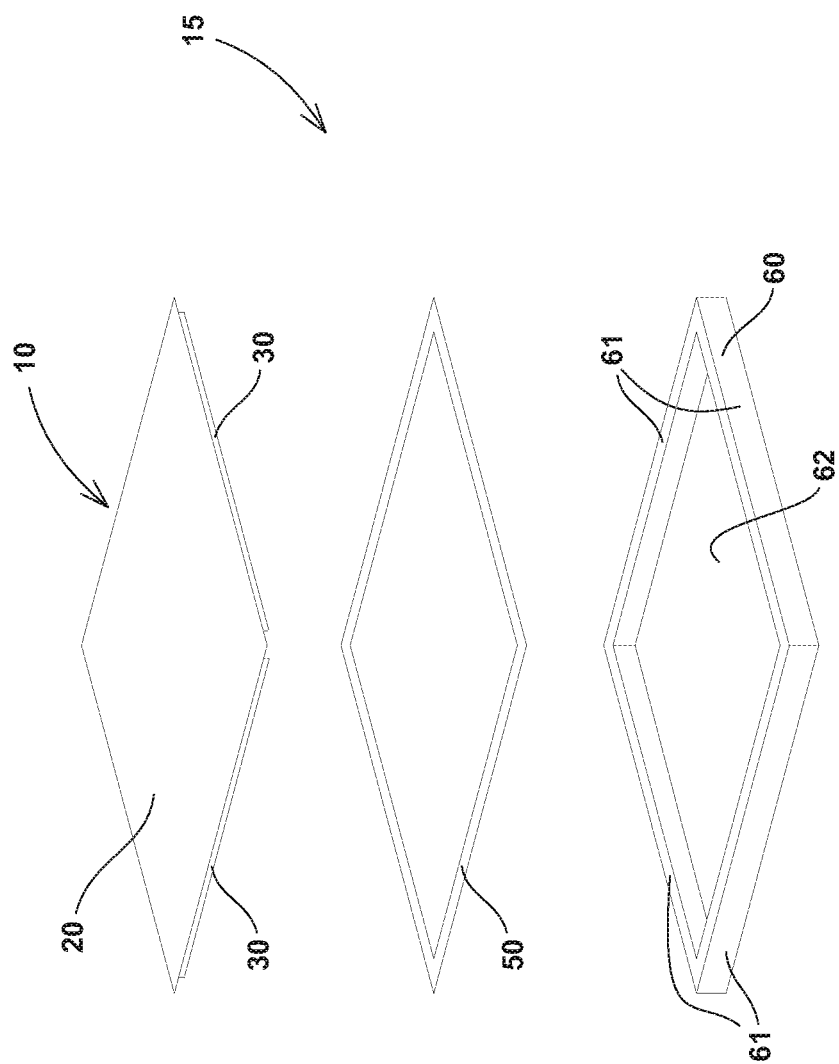

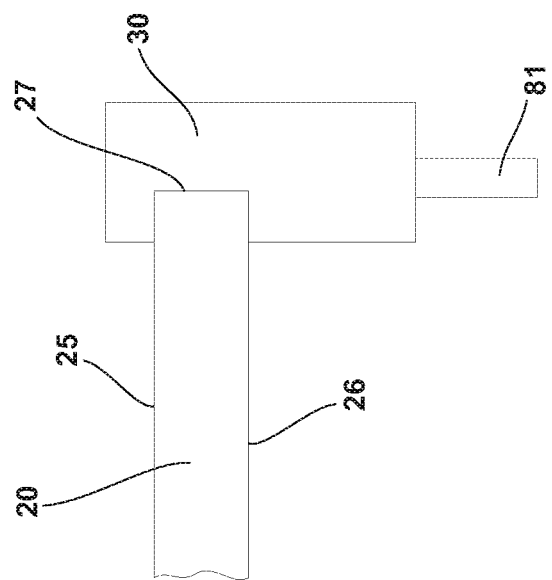

PANEL WITH MAGNETICALLY-CONTROLLED CONNECTORS FOR ATTACHMENT TO A SUPPORT MEMBER

BACKGROUND

The present application is directed to panels with connectors that engage with support members and, more particularly, to panels with magnetically-actuated connectors that are movable between engaged and disengaged positions to secure the panel to a support member.

Connectors are used in a variety of different applications to connect a first member to a second member. The connectors may be attached to a first member in a variety of different manners. The connectors may be adjustable between a locked position in which the first member is secured to the second member, and an unlocked position in which the first member is not secured to the second member.

The connectors may be positioned on the first member in a manner such that they are not easily accessible. This may occur when the connector is positioned along a back side of the panel in a position that is difficult to access when positioned at the second member. This may make securing the connectors to the second member difficult due to the lack of access. For instance, a connector on the back side of a solar panel may not be accessible to an installer once the solar panel is positioned on the top of a frame. Likewise, a connector on a back of a plywood panel may not be accessible once the panel is placed against wall studs.

SUMMARY

The present application is directed to panels configured to engage with a support member. The panels include one or more connectors that are magnetically actuated to move between engaged and disengaged positions.

One aspect is directed to a panel that includes a sheet with a planar first side, an opposing planar second side, and perimeter edges that extend between the first side and the second side. The panel also including connectors positioned on the sheet and extending along at least two of the perimeter edges. Each of the connectors includes: a ferromagnetic member that is movable between a first position away from the second side of the sheet and a second position in closer proximity to the second side of the sheet; and an actuator with ramped surfaces that contact against the ferromagnetic member and extensions that extend away from the second side of the sheet. The actuator is movable between an engaged position when the ferromagnetic member is in one of the first and second positions, and a disengaged position when the ferromagnetic member is the other of the first and second positions.

Another aspect includes that the actuator of each connector is in the engaged position when the ferromagnetic member is in the second position in closer proximity to the second side of the sheet.

Another aspect includes that the actuator includes a body and the ramped surfaces extend outward on a first side of the body and the extensions extend outward from an opposing second side of the body.

Another aspect includes that the ferromagnetic member includes extensions that contact against the ramped surfaces of the actuator.

Another aspect includes that the ferromagnetic member includes multiple sections.

Another aspect includes that the connectors are positioned along the perimeter edges on opposing sections of the sheet.

Another aspect includes that each of the perimeter edges and the connectors are straight and the connectors are aligned parallel with the perimeter edges.

Another aspect includes a biasing member that biases the actuator.

An aspect is also directed to a panel that includes a sheet with a first side and an opposing second side. One or more connectors are positioned on the sheet. Each of the connectors includes: a body with a first side and a second side; a first set of tabs that extend outward beyond the first side of the body with each of the first set of tabs including a side aligned in one of an obtuse and an acute angle; a second set of tabs that extend outward beyond the first side of the body with each of the second set of tabs including a side aligned in the other of an obtuse and an acute angle; extensions that extend outward beyond the second side of the body; a first ferromagnetic member positioned on the first side of the body and including first extensions that are positioned in proximity to the first set of tabs; and a second ferromagnetic member positioned on the first side of the body and including second extensions that are positioned in proximity to the second set of tabs. The first ferromagnetic member is movable in a first direction with the first extensions contacting against the first set of tabs and moving the sliding actuator towards an engaged position. The second ferromagnetic member is movable in a second direction with the second extensions contacting against the second set of tabs and moving the sliding actuator towards an engaged position.

Another aspect includes a biasing member that biases the sliding actuator.

Another aspect includes a housing with a wall with slots positioned in the wall, the extensions of the first and second ferromagnetic members being positioned in the slots.

Another aspect includes the sliding actuators being aligned parallel with perimeter edges of the sheet.

Another aspect includes connectors positioned on a second side of the sheet.

Another aspect includes the connectors are positioned on perimeter edges of the sheet.

An aspect is directed to a method of connecting a panel to a support. The method includes magnetically attracting a first ferromagnetic member positioned on a second side of the panel towards the panel. The method includes contacting a first projection on the first ferromagnetic member against a first ramped surface of an actuator and sliding the actuator in a first direction along the second side of the panel and engaging extensions on the actuator with the support. The method includes moving the first ferromagnetic member away from the second side of the panel while the extensions remained engaged with the support. The method includes magnetically attracting a second ferromagnetic member positioned on a second side of the panel towards the panel. The method includes contacting a second projection on the second ferromagnetic member against a second ramped surface of the actuator and sliding the actuator in a second direction along the second side of the panel and disengaging the extensions from the support.

Another aspect includes moving the first ferromagnetic member towards the second side of the panel when the second ferromagnetic member is positioned away from the second side of the panel.

Another aspect includes moving the second ferromagnetic member towards the second side of the panel when the first ferromagnetic member is positioned away from the second side of the panel.

Another aspect includes biasing the actuator while moving the first and second ferromagnetic members towards the panel.

Another aspect includes maintaining the second ferromagnetic member stationary when attracting the second ferromagnetic member towards the panel.

The various aspects of the various embodiments may be used alone or in any combination, as is desired.

BRIEF DESCRIPTION OF THE DRAWINGS

FIG. 1A is a top schematic view of a panel and a tool that applies a magnetic flux.

FIG. 2 is an exploded perspective view of a seal that is positioned between a panel and a frame.

FIG. 18 is a partial schematic side view of a connector attached to a lateral edge of a sheet.

DETAILED DESCRIPTION

Figure 1B:
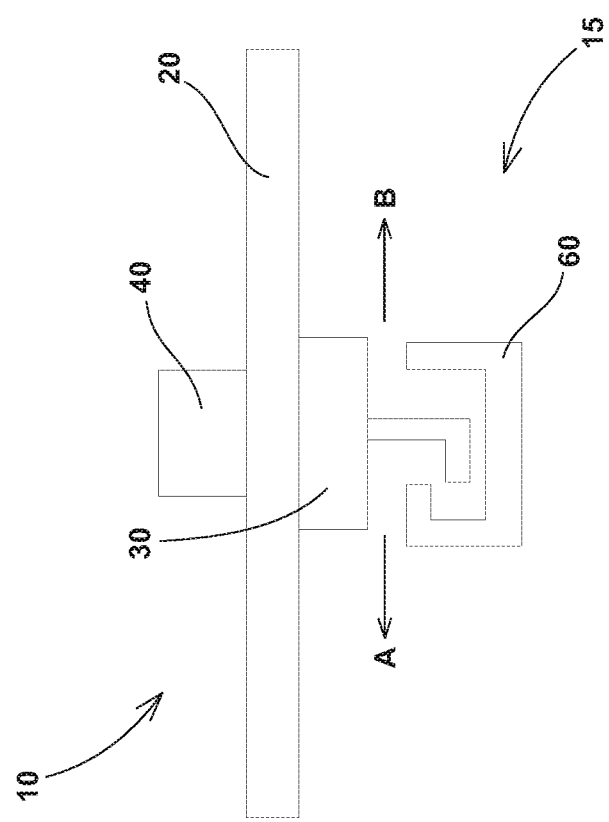
FIG. 1B is a schematic side view of a panel with one or more extensions that engage with one or more extensions of a frame.

The present application is directed to panels that are equipped with magnetically-controlled connectors that are movable between an open position and a closed position. When the connectors are in the open position, the panels can be moved relative to the support frame. In the closed position, the connectors engage with the support frame to secure the panel to the frame.

FIG. 1A illustrates a top schematic view of panel 10 that includes a sheet 20 and connectors 30. The sheet 20 has an enlarged width and length and can include a variety of different sizes and shapes. The connectors 30 are positioned on a bottom side or lateral edge of the sheet 20. A magnetic tool 40 is configured to apply a magnetic flux from the top side of the sheet 20 to the connectors 30 for selective positioning between the open and closed positions. A single tool 40 can be used to adjust multiple connectors 30, or a separate tool 40 can be necessary for each connector 30.

FIG. 1B illustrates a side schematic view of a panel 10 positioned at a frame 60. The panel 10 includes a sheet 20 and the connector 30 attached to the bottom side of the sheet 20. The panel 10 is positioned on the frame 60 that receives an extension of the connector 30. A magnetic tool 40 applied to the connector 30 from the top side of the sheet 20 moves the connector in opposing directions indicated by arrows A and B between open and closed positions. These positions provide for selectively engaging the panel 10 to the frame 60.

FIG. 2 illustrates an exploded view of an array 15 with one or more panels 10 and frame 60. The panel 10 includes a sheet 20 with one or more connectors 30 on a bottom side. The frame 60 is configured to support the panel 10 and to engage with the one or more connectors 30. A seal 50 can be positioned between the panel 10 and the frame 60 to prevent the ingress of water and/or debris. Further, the one or more connectors 30 can apply a clamping force to the frame 60 in the closed position. This force can compress the seal 50 and further improve the ability of the seal 50 to keep out water and/or debris.

Figure 3:
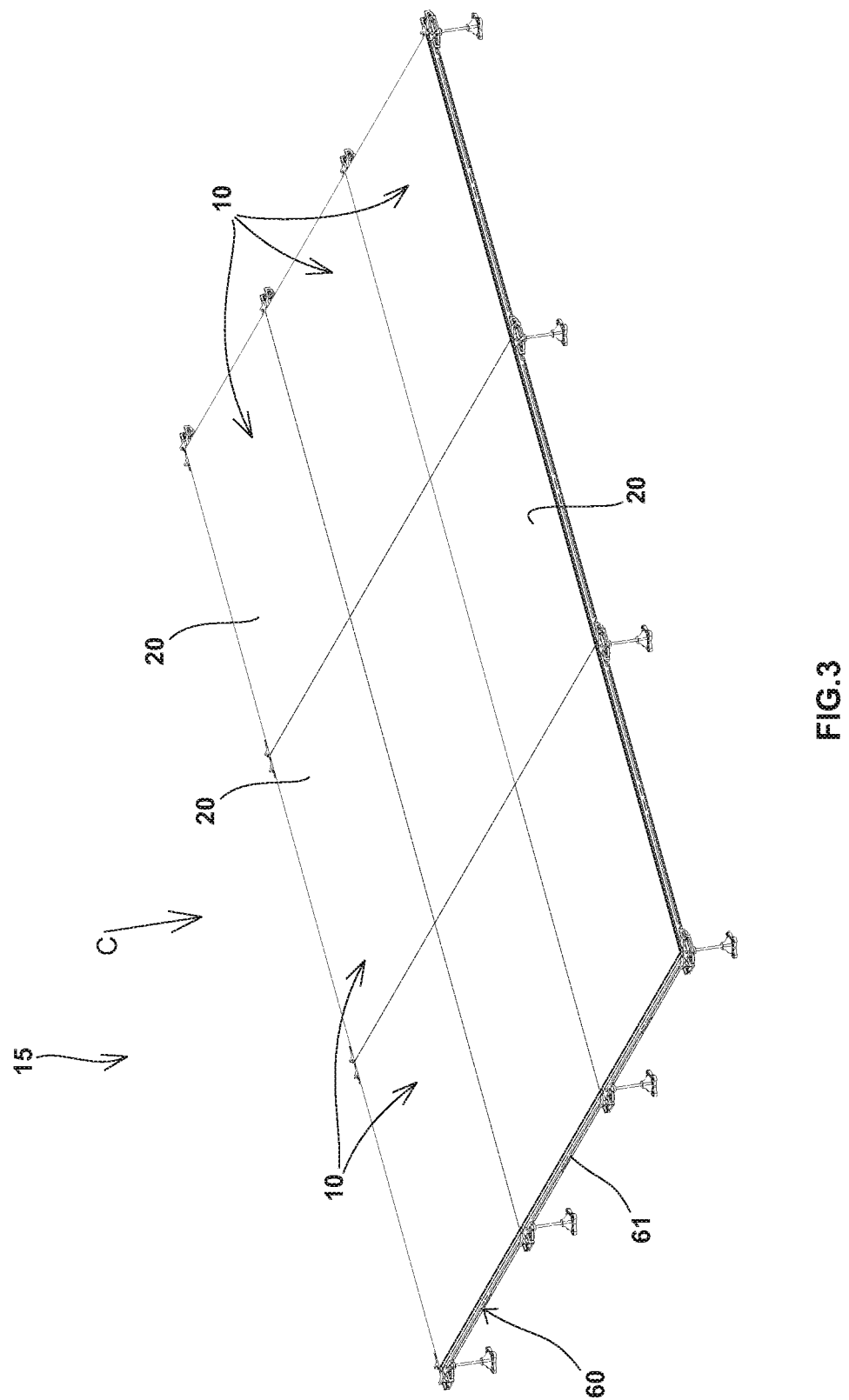
FIG. 3 is a perspective view of an array of multiple panels engaged with a frame.

An array 15 can include one or more panels 10 attached to a frame 60. FIG. 3 illustrates a larger array 15 that includes multiple panels 10 that are connected to a frame 60. FIG. 3 specifically includes a solar array 15 configured to obtain usable solar power through photovoltaics. The sheets 20 of the panels 10 generally include solar cells that absorb and convert sunlight into electricity. The solar array 15 includes various electrical contacts and cabling, and various electronics such as an inverter to change the electric current from DC to AC. As illustrated in FIG. 3, the solar array 15 is configured for the panels 10 to be inserted and removed from above the support frame 60. The panels 10 are inserted in a direction shown by arrow C that is perpendicular to a plane formed by the solar panels 10 on the frame 60. Once inserted, the one or more connectors 30 extend from the underside to engage with the support frame 60.

The connectors 30 can be aligned in a variety of orientations relative to the sheet 20 to engage with the frame 60. This can include the connectors 30 moving parallel to the edges of the sheet 20. This can also include moving towards and away from a center of the sheet 20. The perimeter edges of the sheet can be straight and the connectors 30 can be straight. The connectors 30 can be aligned parallel with the perimeter edges.

Figure 4:
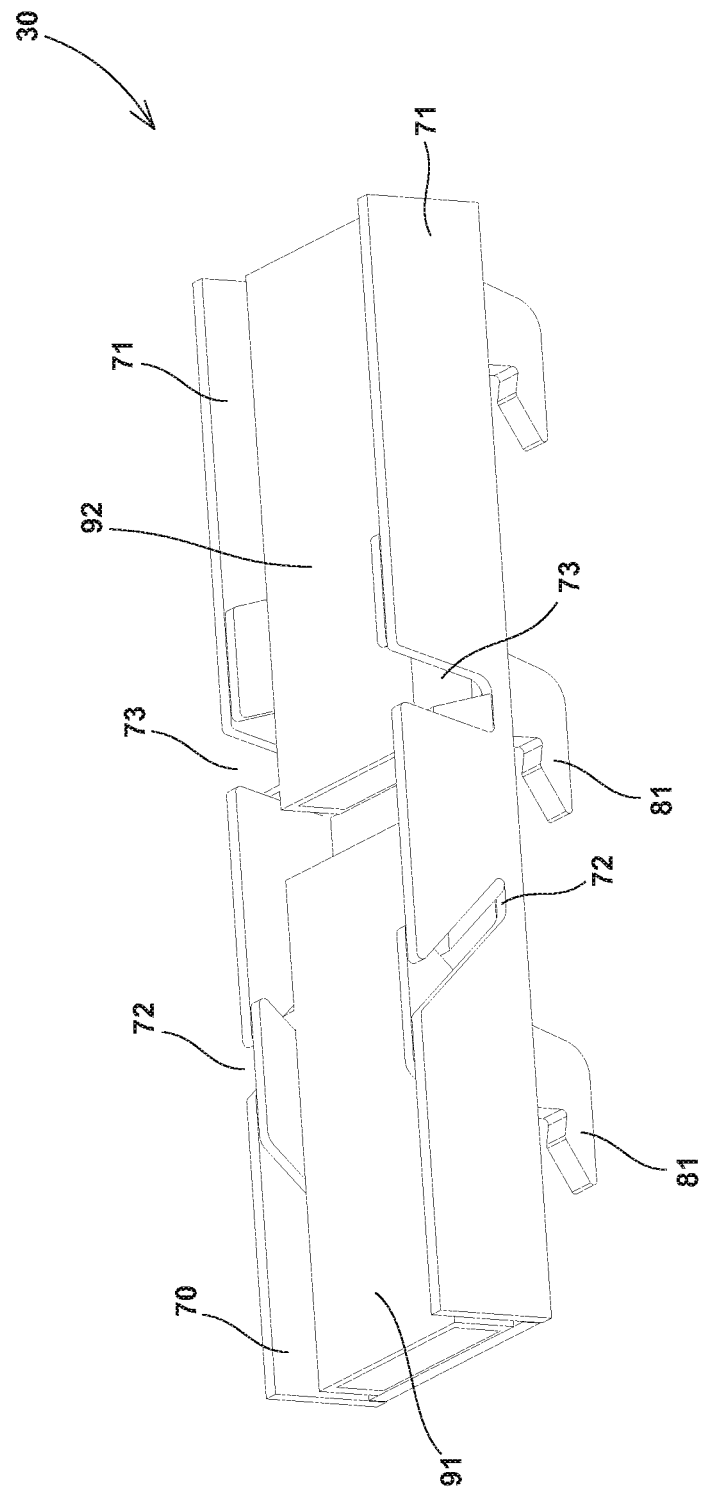
FIG. 4 is a perspective view of a connector.
Figure 5:
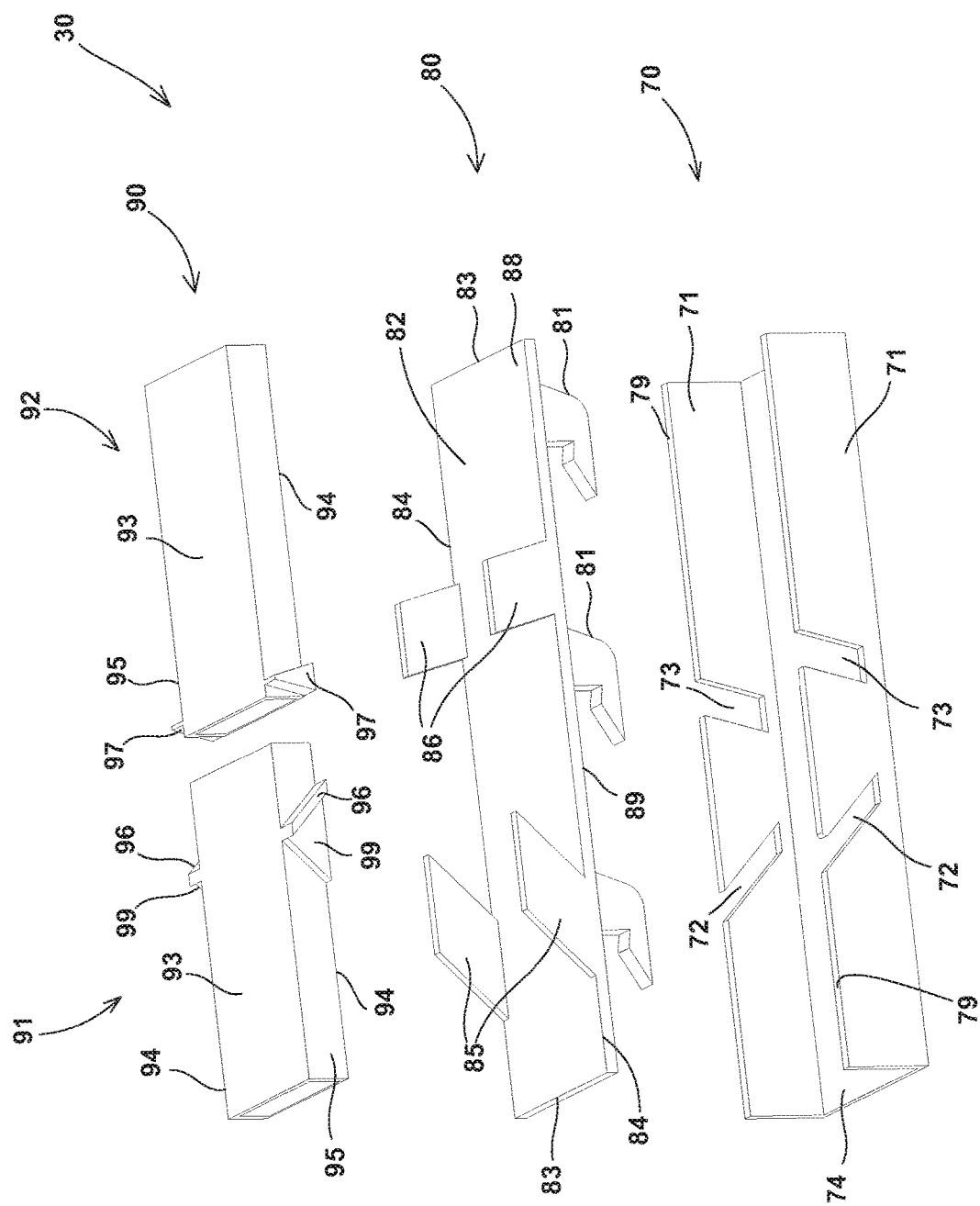
FIG. 5 is an exploded perspective view of a connector that includes a housing, a sliding actuator, and an armature.

FIG. 4 illustrates a connector 30 configured to be attached to a bottom side of the sheet 20. FIG. 5 illustrates an exploded view of the connector 30. The connector 30 includes a housing 70, a sliding actuator 80, and an armature 90. The connector 30 is movable between an open position in which the extensions 81 of the sliding actuator 80 are disengaged from the frame 60, and a closed position in which the extensions 81 are engaged with the frame 60. The connector 30 is movable between the open and closed positions by a magnetic force that is applied through the tool 40.

The connector 30 can include a variety of different sizes. The connector 30 can extend along the entirety or just a limited section of the length of the sheet 20. The connector 30 can also include various numbers of extensions 81 to engage with the frame 60. The extensions 81 can include a variety of shapes and/or sizes to engage with the frame 60.

The housing 70 is positioned around at least a portion of the sliding actuator 80 and the armature 90. The housing 70 includes a floor 74 and a pair of opposing rails 71. The rails 71 each include an elongated shape with opposing ends and exposed sides 79 that extend between the ends. Each of the rails 71 includes at least one first slot 72 and at least one second slot 73. Each of the slots 72, 73 extend a limited distance inward from the exposed longitudinal side 79. One or more slots can extend through the floor 74 to receive the extensions 81. The slots can include an elongated shape to allow for the extensions 81 to move between the open and closed positions.

Figure 6:
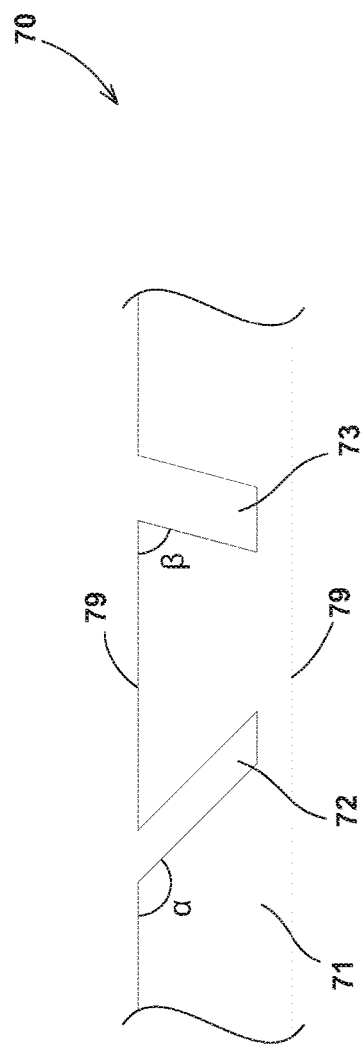
FIG. 6 is a partial side view of slots extending into a rail of a housing.

FIG. 6 illustrates a rail 71 that includes a pair of slots 72, 73. The first slot 72 is slanted at an angle α relative to the longitudinal side 79 into which it extends. The second slot 73 is slanted at an angle β relative to the same longitudinal side 79. The slots 72, 73 are oriented in opposing directions with the first slot 72 angled in a first direction and the second slot 73 angled in an opposing second direction. Relative to the longitudinal side 79, one of slots 72, 73 is angled at an acute angle and the other is angled at an obtuse angle. FIG. 6 includes the first slot 72 at an acute angle and the second slot 73 at an obtuse angle. These angles can be reversed in other designs. The longitudinal sides 79 contact against and are attached to the bottom side of the sheet 20. The attachment can be accomplished by one or more of adhesives and mechanical fasteners.

As illustrated in FIG. 5, the sliding actuator 80 is positioned at the housing 70. The actuator 80 includes a body 82 with a planar shape 82 having a top surface and an opposing bottom surface. The body 82 further includes opposing ends 83 and opposing longitudinal sides 84. The extensions 81 extend outward from the bottom surface of the body 82. Tabs 85, 86 extend outward from the opposing top surface along the opposing longitudinal sides. A first set of tabs 85, 86 on a first longitudinal side 84 is spaced apart from a second set of tabs 85, 86 on the opposing second longitudinal side 84. The sliding actuator 80 can be positioned between within the housing 70 with the extensions 81 extending through slots in the floor 74.

Figure 7:
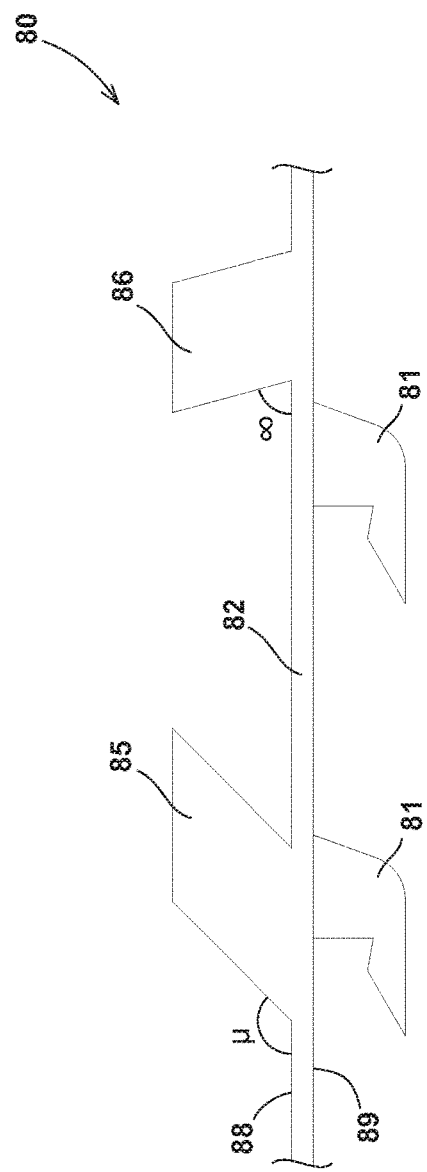
FIG. 7 is a partial side view of a sliding actuator.

FIG. 7 illustrates the sliding actuator 80 that includes the body 82 with a top side 88 and a bottom side 89. Tabs 85, 86 extend outward from the top side 88 and extensions 81 extend outward from the bottom side 89. The number of tabs 85, 86 and extensions 81 can vary, as well as the relative spacing along the length of the body 82. The first tabs 85 extend outward from the top side 88 at an angle μ. The second tabs 86 extend outward at an angle ∞. The tabs 85, 86 are oriented in opposing directions with one of the tabs 85, 86 having an acute angle with the top side 88 and the having an obtuse angle. FIG. 7 includes the first tab 85 at an obtuse angle and the second tab 86 at an acute angle, with other designs reversing the orientations.

The armature 90 is located on the top side 88 of the sliding actuator 80. The armature 90 includes a first member 91 and a second member 92. Each of the members 91, 92 includes a flat bottom side 94 that contacts against and slides across the flat top side 88 of the sliding actuator 80. The members 91, 92 also include lateral sides 95. The armature 90 is constructed from a ferromagnetic material that is attracted to the tool 40. This can include the armature 90 constructed from various materials, including but not limited to iron, cobalt, and nickel, and mixtures thereof. The members 91, 92 can be constructed from the same or different ferromagnetic materials. The entire armature 90 can be constructed from the ferromagnetic material, or one or more sections of the armature 90 can be constructed from the ferromagnetic material. One design includes each member 91, 92 constructed from an outer housing with a ferromagnetic material positioned within an interior of the outer housing.

As illustrated in FIG. 5, the first member 91 includes projections 96 that extend outward from the opposing lateral sides 95. The projections 96 are sized to fit within and move along the first slots 72 of the housing 70. Smaller projections 99 extend outward from each lateral side 95 at the projections 96. The projections 99 include an angled face that pushes against a corresponding face of the tab 85. The second member 92 includes a pair of projections 97 that extend outward from the opposing lateral sides 95. These projections 97 are sized to fit within and move along the second slots 73 of the housing 70. Further, the projections 97 each include an angled face that moves against the tab 86 of the sliding actuator 80.

The connector 30 is connected to the bottom side of the sheet 20. The connector 30 is movable between the open and closed positions due to a magnetic force applied by the tool 40 that is positioned on the top side of the sheet 20. The tool 40 applies separate magnetic forces to the first member 91 and the second member 92 for relative movement between the two to move the sliding actuator 80 and thus the extensions 81 into and out of engagement with the frame 60.

Figure 8:
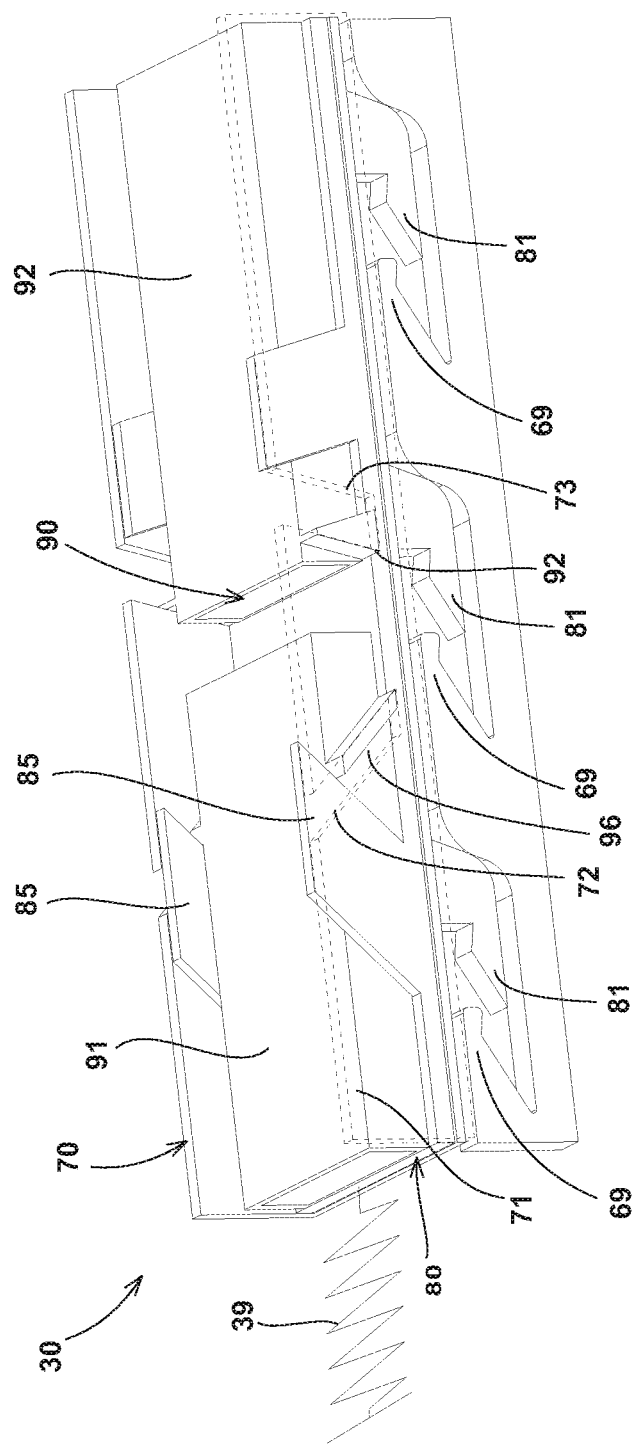
FIGS. 8-12 are cut-away perspective views of a connector moving between open and closed positions to engage with extensions of a frame.

FIGS. 8-12 illustrate the connector 30 engaging and disengaging from the frame 60. The connector 30 is configured to be connected to the bottom side of the sheet 20 (not illustrated) and positioned on the frame 60. For clarity, just the extension 69 of the frame 60 is illustrated. As illustrated in FIG. 8, the connector 30 is positioned at the frame with the extensions 81 of the connector 30 disengaged from the extensions 69 of the frame. The connector 30 is oriented with the projections 96 of the first member 91 of the actuator 90 positioned in the first slots 72 of the housing 70, and the projections 97 of the second member 92 positioned in the second slots 73. A biasing member 39 biases the sliding actuator 80 in one direction (to the right as illustrated in FIG. 8). This biasing force positions the tabs 85 of the sliding actuator 80 in contact with the projections 96 and tabs 86 in contact with the projections 97. No magnetic force is acting on the armature 90.

Figure 9:
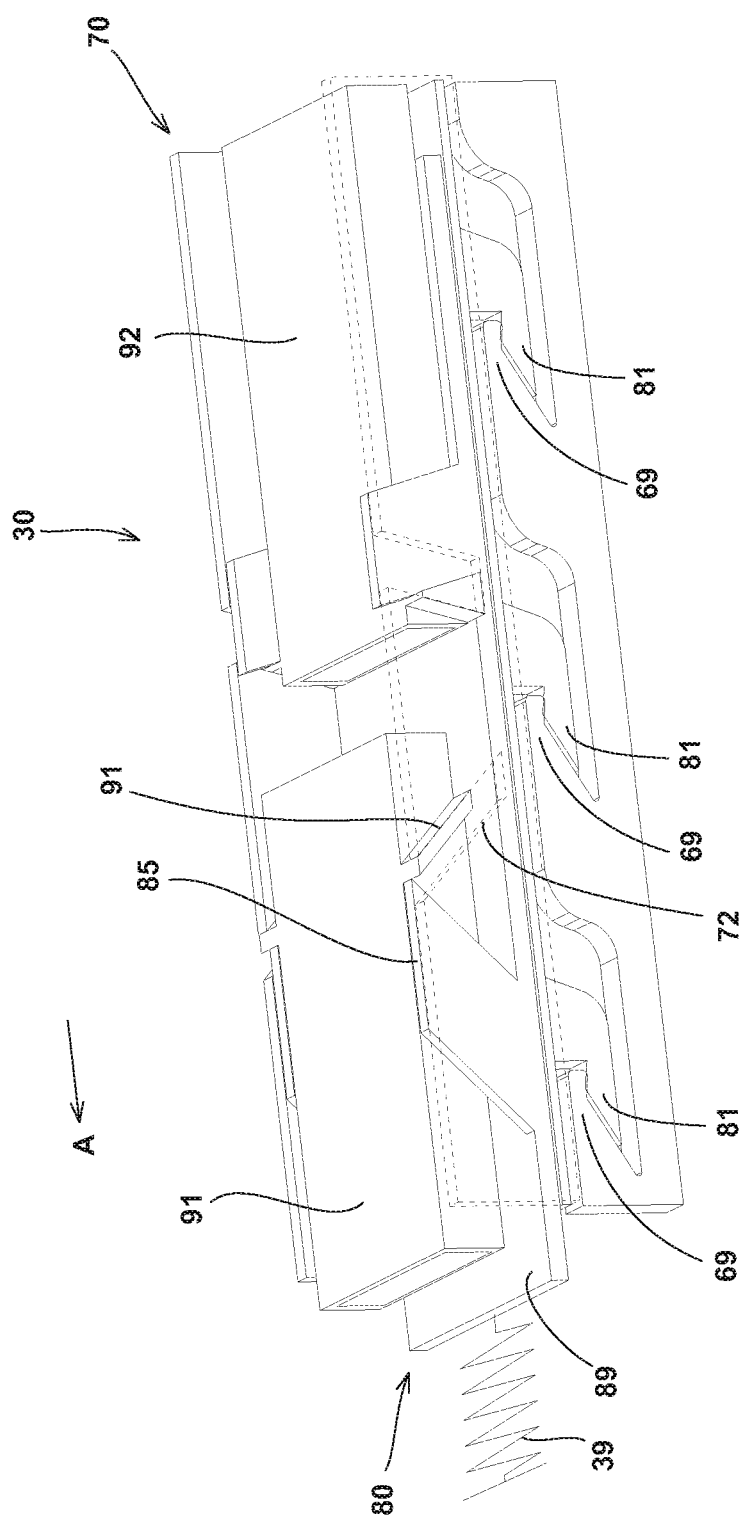

As illustrated in FIG. 9, the first member 91 is raised upward due to the attraction of a magnetic force from a tool 40 (not illustrated). The second member 92 is not acted upon by a magnetic force and remains in the same position against the bottom 89 of the sliding actuator 80. Movement of the first member 91 upward away from the bottom 89 causes the projections 96 to slide along the first slots 72 in the rails 71 of the housing 70. The angle of the first slots 72 causes the first member 91 to move in the direction A relative to the housing 70. Further, the first member 91 contacts against the tabs 85 of the sliding actuator 80 as it moves along the first slots 72. This movement causes the sliding actuator 80 to also move in the direction A relative to the housing 70 and against the force applied by the biasing member 39. The movement of the sliding actuator 80 causes the extensions 81 to move into engagement with the extensions 69 of the frame 60.

Figure 10:
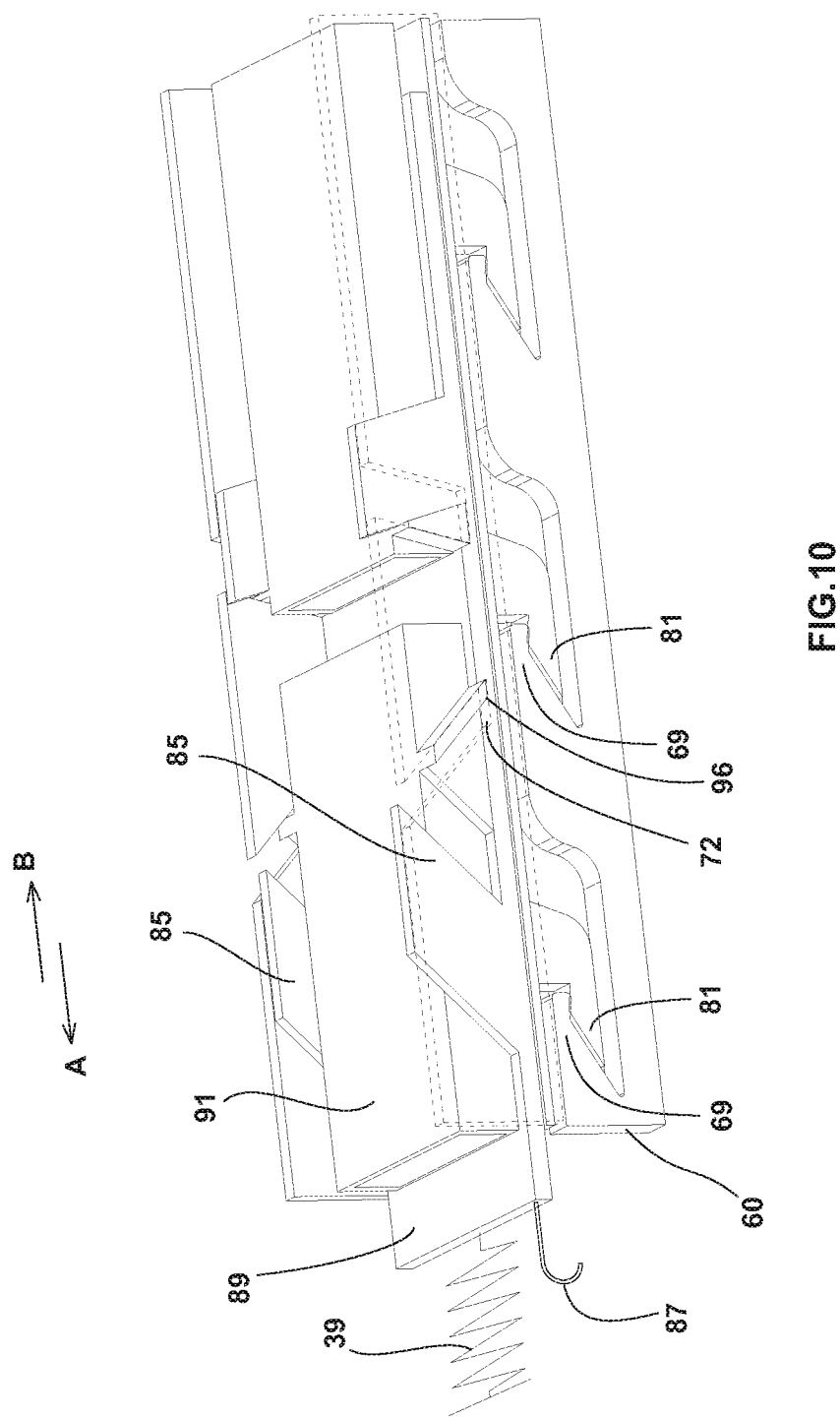

As illustrated in FIG. 10, once the sliding actuator 80 has moved relative to the housing 70 in the direction A, the magnetic force is removed from the first member 91. This causes the first member 91 to move back into contact with the bottom 89 of the sliding actuator 80 and to move relative to the housing 70 in the direction B. The sliding actuator 80 remains at the same position relative to the housing 70 because the projections 96 of the first member 91 move away from the tabs 85 of the sliding actuator 80. The first member 91 can return towards the sliding actuator 80 due to gravity and/or the force applied by the biasing member 39.

In the engaged position illustrated in FIG. 10, the sliding actuator 80 remains engaged with the frame 60 due to the contact between the extensions 69, 81. The extensions 69, 81 are shaped to maintain the contact and prevent separation due to the force applied to the sliding actuator 80 by the biasing member 39. The sliding actuator 80 can also include a connector 87 that engages with the frame 60 when the sliding actuator 80 is in the engaged position. This connector 87 prevents the sliding actuator 80 from inadvertently disengaging from the extensions 69.

Figure 11:
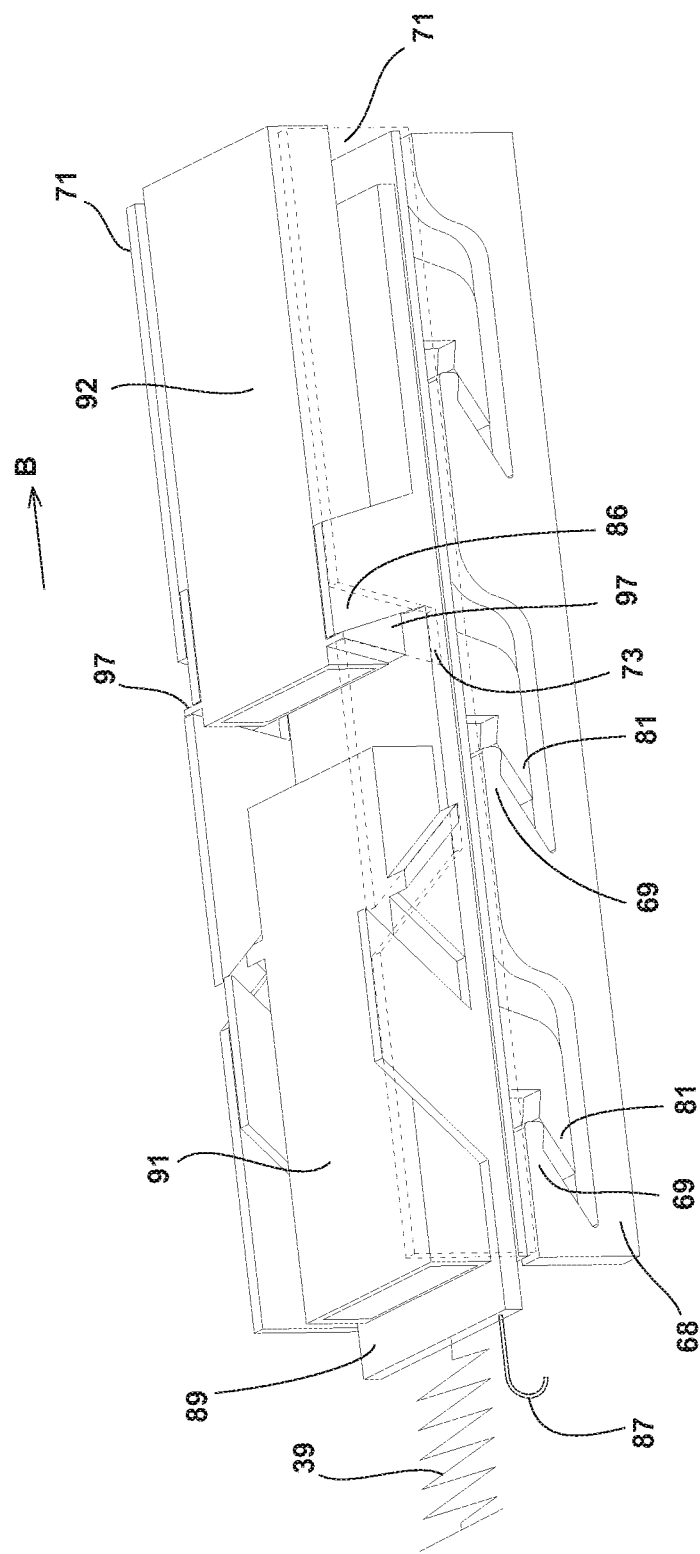

FIG. 11 illustrates the sliding actuator 80 moving in the direction of arrow B and disengaging from the extensions 69. The disengagement is caused by the second member 92 being attracted by a magnetic flux applied by the tool 40 (not illustrated) and moving upward away from the bottom 89 of the sliding actuator 80. This movement causes the projections 97 of the second member 92 to move along the slots 73 in the rails 71. This movement also causes the projections 97 to contact against tabs 86 of the sliding connector 80 and move the sliding connector 80 in the direction of arrow B. This movement in turn causes the extensions 81 to move away from the extensions 69. This movement can also cause the connector 87 to disengage from the frame 60.

Figure 12:
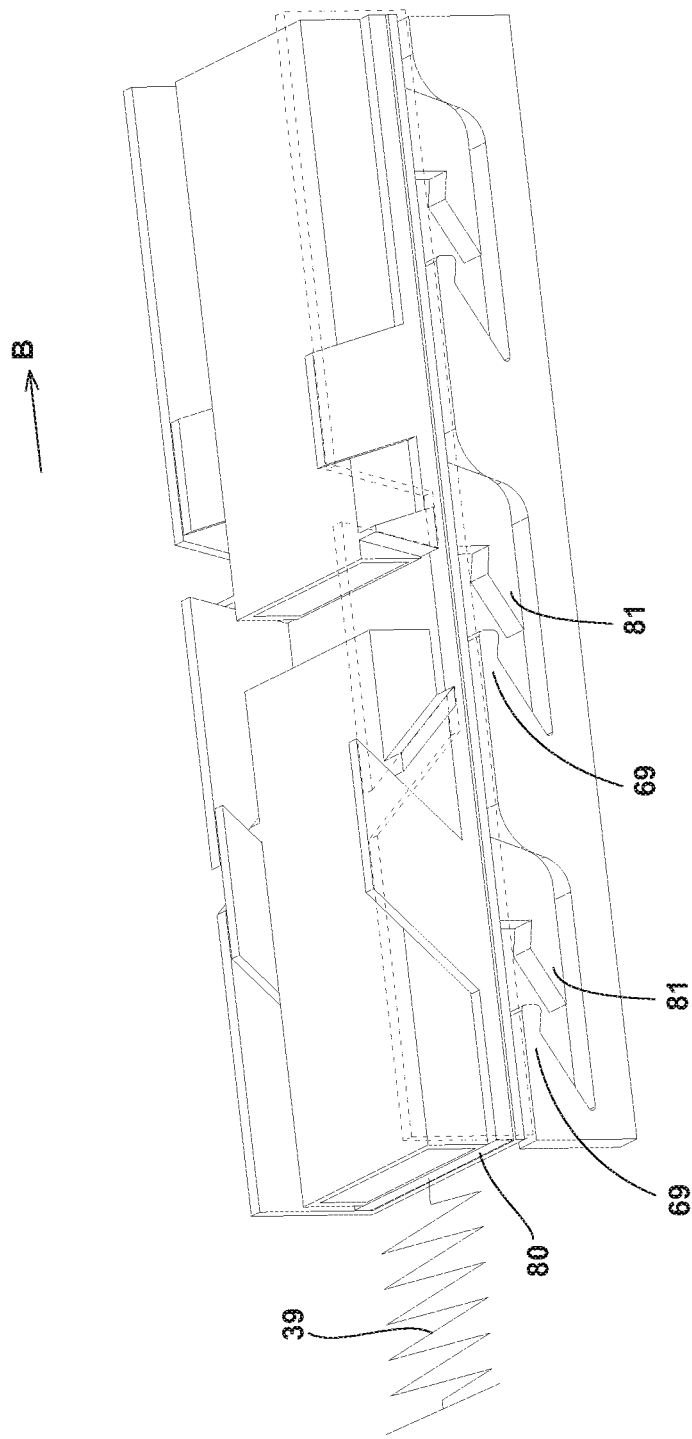

Once the sliding actuator extensions 81 are disengaged from the frame extensions 69, the force of the biasing member 39 moves the sliding actuator 80 to the open position. As illustrated in FIG. 12, the sliding actuator 80 has moved in the direction of arrow B and the extensions 81 have disengaged and moved away from the corresponding extensions 69. In this open position, the panel 10 can be removed from the frame 60. Further, there are no electrical or signal transmissions occurring between the panel 10 and the frame 60.

Figure 13:
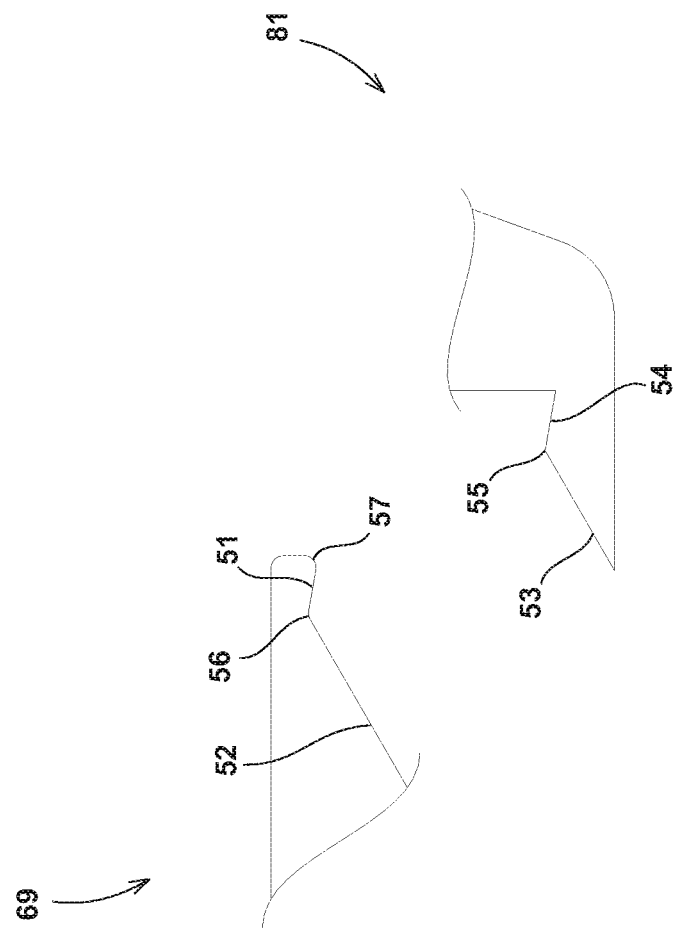
FIG. 13 are a partial side view of extensions of a connector and a frame.

The configuration of the extensions 69, 81 can provide for a holding force in the closed position to maintain the engagement between the panel 10 and the frame 60. As illustrated in FIG. 13, the extension 81 includes a first edge 53 with an increasing tapered section that peaks at a key 55. A second edge 54 falls away from the key 55 to provide a decreasing tapered section. Extension 69 includes a leading end 57 with a first edge 51 having a decreasing taper that decreases to an indent 56, and a second edge 52 with an increasing taper that leads away from the indent 56.

Figure 14:
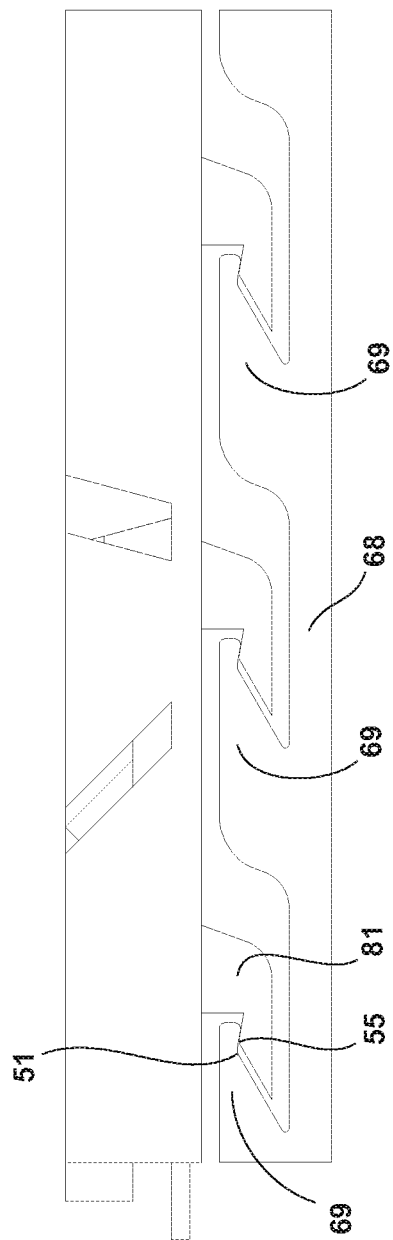
FIG. 14 is a side view of extensions of a connector positioned at extensions of a frame.

When the extension 81 is moved from the open position to the closed position, the edge 53 slides along the leading end 57 until the key 55 moves beyond the end 57. Once the key 55 passes, the edge 54 slides along the back edge 51. As illustrated in FIG. 14, the key 55 remains in contact with the edge 51. This positioning applies a downward force on the panel 10 to maintain the panel 10 seated against the frame 60. This downward force also can deform the seal 50 (see FIG. 2) thus providing a more effective barrier against the ingress of water and/or debris.

The biasing member 39 biases the sliding actuator 80 in one direction. This force provides for maintaining the extensions 69, 81 in contact in the engaged position. This force also provides for the sliding actuator 81 to return to the disengaged position. As illustrated in FIG. 12, the force of the biasing member 39 returns the sliding actuator 80 when the second ferromagnetic member 92 is no longer magnetically attracted.

FIGS. 8-12 include a design in which the biasing member 39 applies a force against movement of the sliding actuator 80 in the direction A. The connector 30 can also be constructed for the biasing member 39, sliding actuator 81, and ferromagnetic members 91, 92 to be configured to move the connector 30 between the engaged and disengaged positions with the force of the biasing member 39 being applied in an opposing direction.

The extensions 69, 81 can also include different shapes and sizes. The angled edges as described above for FIG. 13 provide a downward force to be applied to the panel 10 to apply a compressive force to the seal 50. The extensions 69, 81 can include a variety of other configurations that do not provide a downward force, yet still maintain contact.

The support frame 60 is configured to receive one or more panels 10. As illustrated in FIG. 2, the support frame 60 includes one or more support members 61 that form one or more windows 62 over which a panel 10 extends. The support members 61 can extend around the entirety of the windows 62, or just a limited portion of the windows 62.

Figure 15:
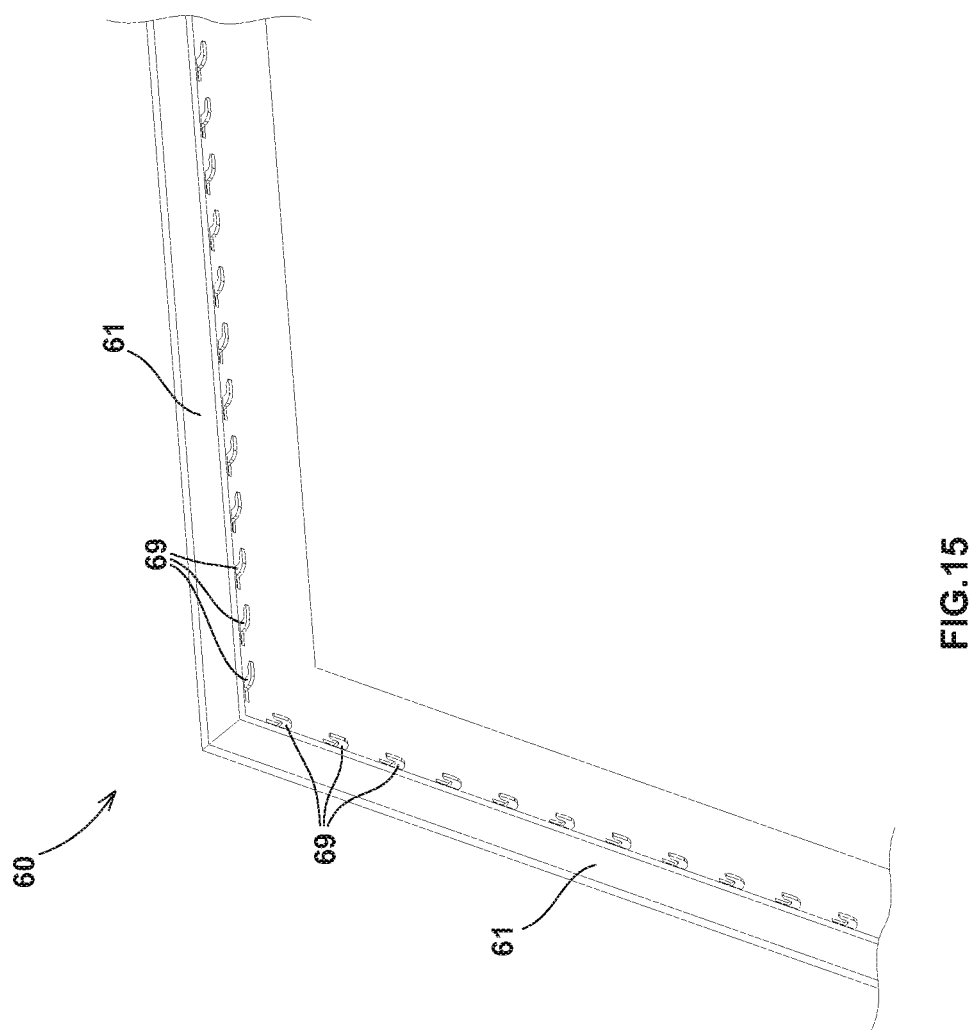
FIG. 15 is a partial perspective view of support members with outwardly-extending extensions.

The extensions 69 are positioned in the support members 61 that form the frame 60. The extensions 69 are positioned to engage with extensions 81 of the connector 30. As illustrated in FIG. 15, the extensions 69 extend outward beyond the surface of the support members 61. This can also include the extensions 69 recessed within an interior of the support members 61. The extensions 69 are positioned at an opening that extends into the support members 61 through which the extensions 81 of the connector 30 are inserted for engagement.

As illustrated in FIG. 14, the extensions 69 can be interconnected by a body 68. That is, the extensions 69 and body 68 form a single, integral component. The extensions 69 and body 68 can be constructed from a material that conducts energy to provide a conduit for transmitting energy and/or communication signals to and/or from the panel 10. When the connector 30 is in the engaged position, the contact between the extensions 81, 69 provides for the transfer of energy. Further, the hooks 69 and body 68 can provide for communication signals to transfer to and/or from the panel in a similar manner. The material includes but is not limited to metals.

Figure 16:
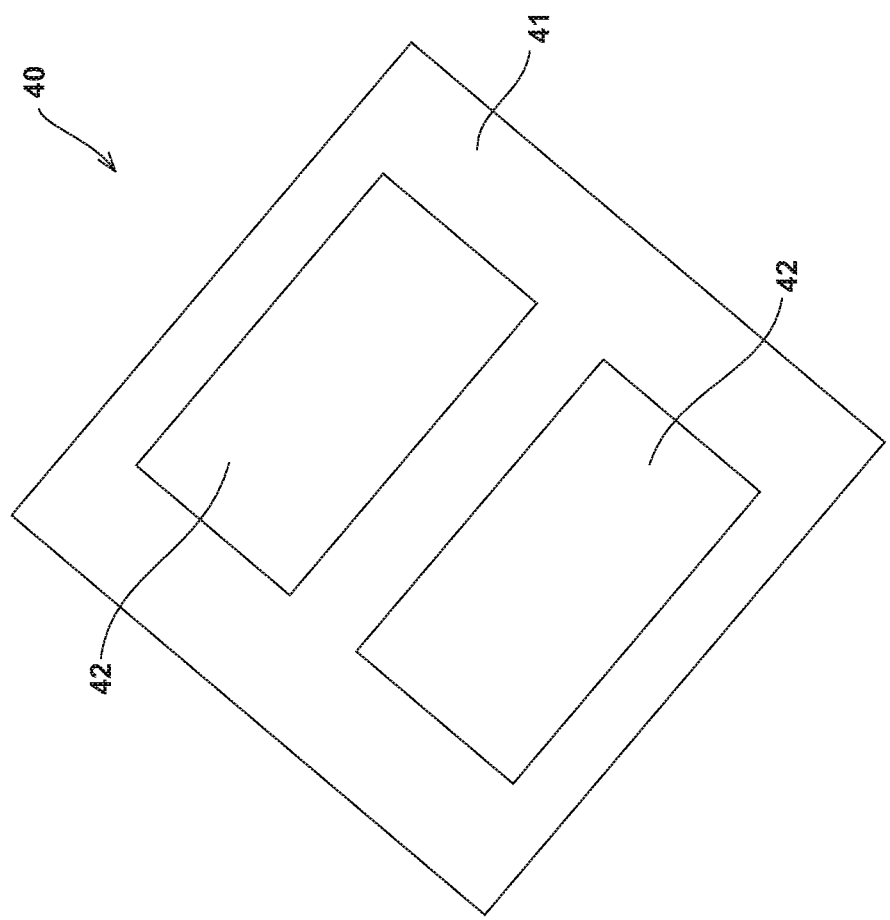
FIG. 16 is a schematic view of a tool.

The tool 40 provides a magnetic flux to control the movement of the connectors 30 between the open and closed positions. As schematically illustrated in FIG. 16, the tool 40 includes a frame 41. The frame 41 can include a handle that is grasped by the user. One or more magnets 42 are attached to the frame 41 and configured to apply a magnetic flux to one or more nearby connectors 30. The magnets 42 can be the same or different. One type of magnet 42 is a permanent magnet that is constructed from a magnetized material that produces a persistent magnetic field. The magnet 42 can be constructed from a ferromagnetic material, such as but not limited to iron, nickel, neodymium, and cobalt. When the permanent magnet 42 is brought into proximity to the connector 30 on the panel 10, the magnetic flux causes movement of the armature 90 as described above to move the connector 30 between the open and closed positions.

One or more of the magnets 42 can be electromagnets that are made from a wire coil. In some embodiments, the wire coil is wrapped around a core. The electromagnet 42 produces a magnetic flux when current is supplied to the wire coil. The core can be constructed from a ferromagnetic material to greatly enhance the produced magnet flux. The tool 40 can include components to supply electrical power to the one or more electromagnets. This can include a power source such as single-use and rechargeable batteries. The tool 40 can also be configured to plug into a conventional AC power source. The tool 40 can include one or more switches to control power to the electromagnets. The tool 40 can also include one or more capacitors and relays to control the power supplied to one or more of the magnets 42.

The magnets 42 can be positioned in groups that are each positioned to provide a magnetic flux to the different members 91, 92 of the armature 90. This includes providing a magnetic flux to each of the members 91, 92.

The tool 40 can be configured for one or more magnets 42 to emit the magnetic flux in a direction that is perpendicular to the sheet 20 of the panel 10. One or more of the magnets 42 can be further configured to emit the magnetic flux at a non-perpendicular angle relative to the sheet 20. Embodiments include the magnets 42 set at angles between 0°-45° relative to the sheet 20.

Tools for applying a magnetic flux are disclosed in U.S. Ser. No. 15/471,664 that was filed on Mar. 28, 2017 and is hereby incorporated by reference in its entirety.

The panels 10 can include various different types of sheets 20 depending upon the context. As illustrated in FIG. 3, the sheets 20 can include solar cells as part of a solar panel 10. Other contexts include but are not limited to wall panels 10, flooring panels 10, and ceiling panels 10. In the various designs, the sheets 20 include a planar shape with a top side and a bottom side. The sheets 20 can be constructed from a variety of different materials, including but not limited to wood, metal, plastic, glass, and sheetrock. The sheets 20 can have a variety of sizes from a relatively small panel that has width and length dimensions in the inches, to relatively large sizes that have dimensions that are in the feet. Likewise, the arrays 15 can include various sizes depending upon the size and number of panels.

The array 15 can include a variety of sizes. As illustrated in FIG. 3, the frame 60 of the array 15 positions the adjacent panels in a side-by-side configuration such that the panels 10 are in close proximity to the form the array 10. The panels 10 can be positioned such that outer edges of the panels 60 contact together to prevent water or other debris from moving below the panels 10. The seals 50 positioned between the panels 10 and the frame 60 further prevent the ingress of water or other debris. The seals 26 can extend along the entire length or one or more limited sections of the support member 21. The seals are constructed from a flexible material, such as a foam material, that compresses when in contact with the panel 60.

The array 15 is constructed for the panels 10 to be inserted substantially perpendicularly onto the frame 60. Replacement of a panel 10 from the array 15 includes positioning the one or more connectors 30 of the panel 10 in the open position using the tool 40. Specifically, the tool 40 is positioned on the top surface of the sheet 20 and the one or more magnets 42 are activated to move the connector 30 that is attached to the bottom surface of the sheet 20 to the open position. Once positioned, the panel 10 can be pulled perpendicularly away from the frame 60. A replacement panel 10 can then be inserted in a perpendicular direction into the opening. Once positioned, the tool 40 can again be used to move the connectors 30 to the closed position to engage the frame 60.

Figure 17:
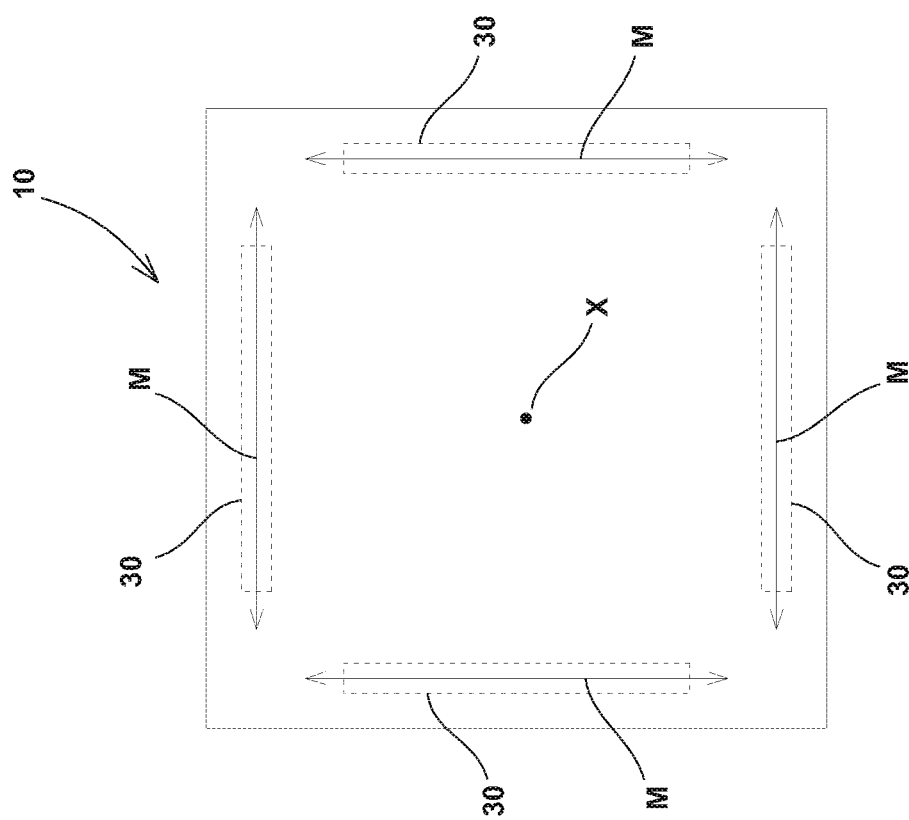
FIG. 17 is a schematic view of connectors of a panel and movement directions of the connectors.

As illustrated in FIG. 17, the connectors 30 extend along the edges of the panel 10. The connectors 30 move between the open and closed positions as indicated by arrows M. This movement can be parallel to the edges of the panel 10. The movement M can be tangent to a center point X of the panel 10. The connectors 30 can be positioned in other orientations that can be towards and away from the center point X.

The connectors 30 can be attached to the bottom or top side of the sheet 20. FIG. 18 illustrates a connector 30 that is attached to lateral side 27 of the sheet 20. The connector 30 further extends over a portion of the top side 25 and bottom side 26 of the sheet 20. The one or more extensions 81 extend outward from the connector 30 to engage with the frame 60. FIG. 18 includes the one or more extensions 81 extending outward from the bottom side 26 of the sheet 20. Other designs can include the extensions 81 extending outward from the lateral side 27.

When applying the tool 40 to the panel 10, the tool 40 is positioned on the top surface of the sheet 20 and acts on the connectors 30 that are attached to the bottom side of the sheet 20. The tool 40 magnetically attracts the armature 90 towards the sheet 20. This movement can be perpendicular to a plane formed by the sheet 20.

Panels 10 can include different numbers of connectors 30. This can range from a single connector 30 to engage with the frame 60 to two or more connectors 30.

U.S. application Ser. No. 15/401,868 filed on Jan. 9, 2017 discloses a magnetically-controlled connector and is hereby incorporated by reference in its entirety.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

The invention claimed is:

1. A panel comprising:
a sheet comprising a planar first side, an opposing planar second side, and perimeter edges that extend between the first side and the second side;
connectors positioned on the sheet and extending along at least two of the perimeter edges, each of the connectors comprising:
a ferromagnetic member that is movable between a first position away from the second side of the sheet and a second position in closer proximity to the second side of the sheet; and
an actuator with ramped surfaces that contact against the ferromagnetic member and extensions that extend away from the second side of the sheet, the actuator being movable relative to the sheet between an engaged position when the ferromagnetic member is in one of the first and second positions, and a disengaged position when the ferromagnetic member is the other of the first and second positions;
wherein the actuator comprises a body and the ramped surfaces extend outward on a first side of the body and the extensions extend outward from an opposing second side of the body.

2. The panel of claim 1, wherein the actuator is in the engaged position when the ferromagnetic member is in the second position in closer proximity to the second side of the sheet.

3. The panel of claim 1, wherein the ferromagnetic member comprises projections that contact against the ramped surfaces of the actuator.

4. The panel of claim 1, wherein the ferromagnetic member comprises multiple sections.

5. The panel of claim 1, wherein the connectors are positioned along the perimeter edges on opposing sections of the sheet.

6. The panel of claim 1, wherein each of the perimeter edges and the connectors are straight and the connectors are aligned parallel with the perimeter edges.

7. The panel of claim 1, further comprising a biasing member that biases the actuator.

8. A panel comprising:
- a sheet with a first side and an opposing second side;
- one or more connectors positioned on the sheet, each of the connectors comprising:
  - a sliding actuator comprising:
  - a body with a first side and a second side;
  - a first set of tabs that extend outward beyond the first side of the body, each of the first set of tabs comprising a side aligned in one of an obtuse and an acute angle;
  - a second set of tabs that extend outward beyond the first side of the body, each of the second set of tabs comprising a side aligned in the other of an obtuse and an acute angle;
  - extensions that extend outward beyond the second side of the body;
  - a first ferromagnetic member positioned on the first side of the body and comprising first projections that are positioned in proximity to the first set of tabs; and
  - a second ferromagnetic member positioned on the first side of the body and comprising second projections that are positioned in proximity to the second set of tabs;
- the first ferromagnetic member movable in a first direction with the first projections contacting against the first set of tabs and moving the sliding actuator towards an engaged position;
- the second ferromagnetic member movable in a second direction with the second projections contacting against the second set of tabs and moving the sliding actuator along the second side of the sheet towards a disengaged position.

9. The panel of claim 8, further comprising a biasing member that biases the sliding actuator.

10. The panel of claim 8, further comprising a housing with a wall with slots positioned in the wall, the projections of the first and second ferromagnetic members being positioned in the slots.

11. The panel of claim 8, wherein the sliding actuators are aligned parallel with perimeter edges of the sheet.

12. The panel of claim 8, further comprising the connectors positioned on a bottom side of the sheet.

13. The panel of claim 8, wherein the connectors are positioned on the second side of the sheet.

14. The panel of claim 8, wherein the connectors are positioned on perimeter edges of the sheet.

* * * * *